United States Patent
Field

(10) Patent No.: US 9,111,154 B2
(45) Date of Patent: Aug. 18, 2015

(54) ACOUSTIC TAGS FOR E-WASTE TRACKING

(75) Inventor: Christopher David Field, Manly Vale (AU)

(73) Assignee: Empire Technology Development LLC, Wilmington, DE (US)

(*) Notice: Subject to any disclaimer, the term of this patent is extended or adjusted under 35 U.S.C. 154(b) by 83 days.

(21) Appl. No.: 13/811,548

(22) PCT Filed: May 21, 2012

(86) PCT No.: PCT/US2012/038783
§ 371 (c)(1),
(2), (4) Date: Jan. 22, 2013

(87) PCT Pub. No.: WO2013/176646
PCT Pub. Date: Nov. 28, 2013

(65) Prior Publication Data
US 2014/0291387 A1    Oct. 2, 2014

(51) Int. Cl.
*G06K 7/00* (2006.01)
*G06K 7/02* (2006.01)
*G06K 19/07* (2006.01)
*B07C 5/344* (2006.01)
*G06F 17/30* (2006.01)

(52) U.S. Cl.
CPC . *G06K 7/02* (2013.01); *B07C 5/344* (2013.01); *G06F 17/30* (2013.01); *G06K 19/0728* (2013.01); *B07C 2501/0054* (2013.01); *G06K 7/00* (2013.01)

(58) Field of Classification Search
USPC .......................................... 235/435, 439, 487
See application file for complete search history.

(56) References Cited

U.S. PATENT DOCUMENTS

| 5,854,589 A | 12/1998 | How et al. |
| 5,947,256 A | 9/1999 | Patterson |
| 6,082,193 A * | 7/2000 | Paulson ..................... 73/152.58 |
| 6,093,338 A | 7/2000 | Tani et al. |
| 2004/0064979 A1 | 4/2004 | Smith et al. |
| 2005/0080520 A1 | 4/2005 | Kline et al. |
| 2005/0192727 A1 | 9/2005 | Shostak et al. |

OTHER PUBLICATIONS

International Search Report and Written Opinion for PCT/US2012/038783 dated Dec. 7, 2012.
Acoustic tag, http://en.wikipedia.org/wiki/Acoustic_tag (Printed from Internet Jan. 9, 2013).
Acoustic Telemetry, http://www.htisonar.com/micro.htm (Printed from Internet Jan. 9, 2013).
Crocker, Handbook of Acoustics, John Wiley & Sons Inc. (Mar. 1998).

(Continued)

*Primary Examiner* — Matthew Mikels
(74) *Attorney, Agent, or Firm* — Pepper Hamilton LLP

(57) ABSTRACT

Methods, systems and acoustic tags for tracking, locating and identifying an object are disclosed. An acoustic tag may include a power source and a transmitter in electrical communication with the power source. The transmitter may be configured to transmit an acoustic signal. The power source and the transmitter may be configured to be affixed to and/or embedded in an electronic component. The acoustic signal may include a unique acoustic code that is configured to provide information pertaining to one or more of the electronic component and the recyclability of the electronic component.

20 Claims, 5 Drawing Sheets

(56) References Cited

OTHER PUBLICATIONS

De Moura et al., Independent Component Analysis for Passive Sonar Signal Processing, *Advances in Sonar Technology, Chapter 5* (Feb. 2009), pp. 92-110.
Environmental dumping, http://en.wikipedia.org/wiki/Environmental_dumping (Printed from Internet Jan. 9, 2013).
Helping Meteorologists and Oceanographers Worldwide: Improving global forecasts of weather and ocean conditions, http://www.jcommops.org/dbcp (Printed from Internet Jan. 9, 2013).
Pros and Cons of RFID, http://www.ferret.com.au/c/GS1-Australia/PROS-AND-CONS-OF-RFID-n719191 (Printed from Internet Jan. 11, 2013).
Sonar, http://en.wikipedia.org/wiki/Sonar (Printed from Internet Jan. 9, 2013).
CSIRO Marine and Atmospheric Research: Acoustic Tag, http://www.cmar.csiro.au/tagging/tags/acoustic.htm (Printed from Internet Jan. 11, 2013).
Tindal, Satellite meets sonar, links submarines to real world, http://www.zdnet.com/satellite-meets-sonar-links-submarines-to-real-world-1339283951/ (Nov. 21, 2007).
Ultrasonic 3D Tagging System: Technology for Observing Human Activity in the Order of Centimeters, http://web.archive.org/web/20090608121221/http:/www.dh.aist.go.jp/research/enabling/Ultrasonic3DTag/index.php.en (Printed from Internet Jan. 11, 2013).
Waste: Reducing the global impact of e-waste, http://ewasteguide.info/node/3761 (Printed from Internet Jan. 9, 2013).
What do the Codes Mean?, http://morethanyouthink.com/shopping/countrycodes.html (Printed from Internet Jan. 9, 2013).
World Meteorological Homepage, http://www.wmo.int/pages/index_en.html (Printed from Internet Jan. 11, 2013).
Zhou et al., Piezoelectric films for high frequency ultrasonic transducers in biomedical applications, *Progress in Materials Science* (Feb. 2011), 56(2):139-174 (Abstract).
"Why do we know so much about the supply chain and so little about the 'removal-chain'?" accessed at https://web.archive.org/web/20120503172331/http://senseable.mit.edu/trashtrack/, accessed on Sep. 5, 2014, pp. 1-2.

* cited by examiner

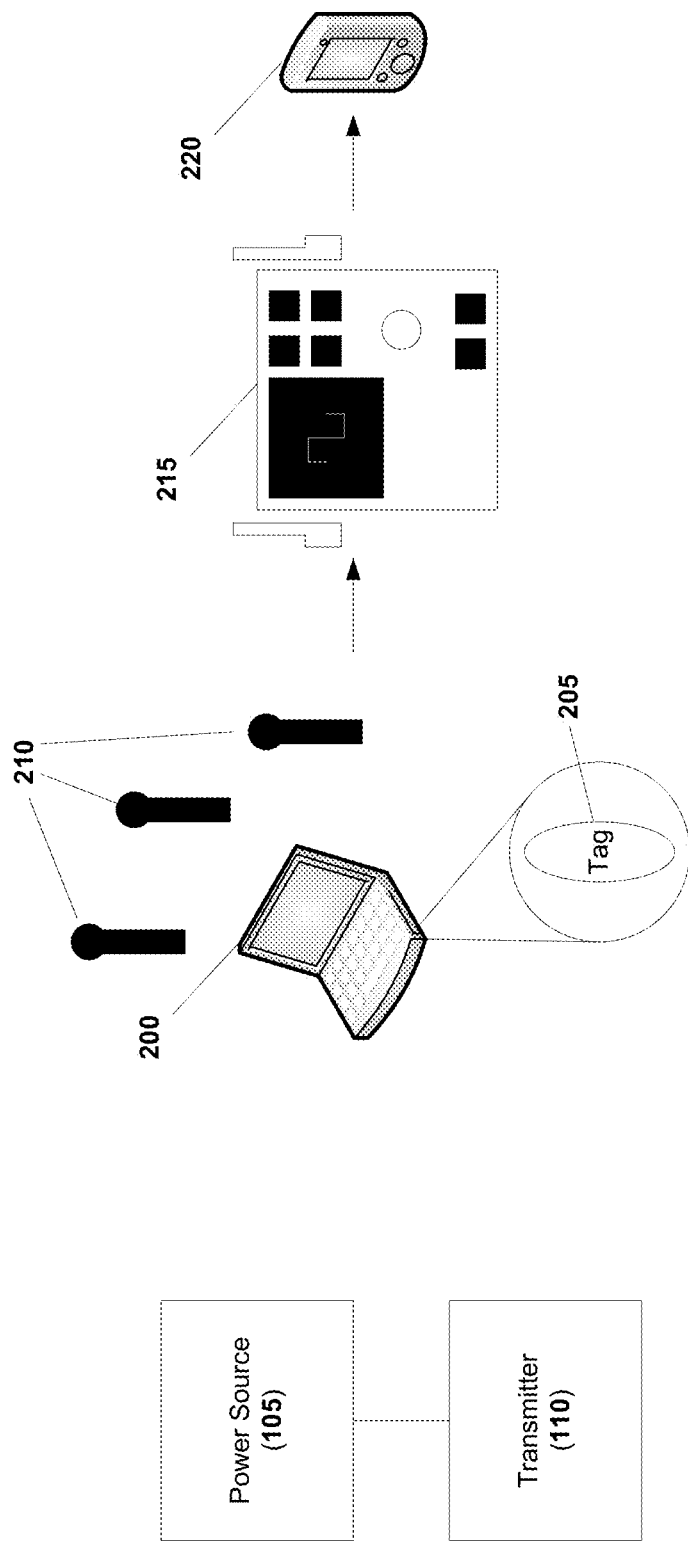

ACOUSTIC TAGS FOR E-WASTE TRACKING

CROSS-REFERENCE TO RELATED APPLICATIONS

This application is a U.S. national stage filing under 35 U.S.C. §371 of International Application No. PCT/US2012/038783, filed May 21, 2012 entitled "Acoustic Tags for E-Waste Tracking," the disclosure of which is incorporated by reference in its entirety.

BACKGROUND

Solid waste recycling rates are gradually increasing, but still remain relatively low. For example, while electronic waste (e-waste) constitutes only 5-8 percent of municipal solid waste, it is accumulating at a rate that is three times greater than other types of solid waste. Indeed, the US Environmental Protection Agency has estimated that only 15-20% of e-waste is recycled.

The remaining e-waste is disposed in landfills and incinerators, resulting in severe environmental consequences. For example, landfilled e-waste can leach toxins into groundwater or nearby bodies of water. Lead can leach from landfills into drinking water supplies, and mercury can leach into surrounding soil. Similarly, incinerated e-waste can release harmful contaminants into the air when e-waste is either crushed or burned. As such, a need exists to be able to tag and track solid e-waste for the purposes of identification, separation of solid components for recycling, and to ensure adequate disposal of hazardous materials.

Furthermore, ocean dumping of waste products, including e-waste, has become a significant issue globally. This is particularly so in developing countries where environmental regulations are less strict. Conventional line of sight identification code technologies, such as radio frequency identification (RFID) are limited in their ability to detect and track waste products dumped under water. As such, a further need exists to be able to tag and track solid e-waste under water for the above-listed purposes.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, an acoustic tag for tracking an electronic component may include a power source and a transmitter in electrical communication with the power source that is configured to transmit an acoustic signal. The power source and transmitter are configured to be one or more of affixed to or embedded in the electronic component. The acoustic signal may include a unique acoustic code that is configured to provide information pertaining to one or more of the electronic component and the recyclability of the electronic component.

In an embodiment, a system for tracking an object may include an acoustic tag affixed to or embedded in the object and configured to transmit an acoustic signal that includes a unique acoustic code that is configured to provide information regarding one or more of the object and the recyclability of the object, one or more signal detection devices that are each configured to detect the acoustic signal, and a digital receiver configured to decode the acoustic signal and compare the decoded signal with one or more entries in a database in order to determine a source of the acoustic signal.

In an embodiment, a system for tracking an object may include an acoustic tag affixed to or embedded in the object and configured to transmit an acoustic signal that includes a unique acoustic code that is configured to provide information regarding one or more of the object and the recyclability of the object, one or more hydrophones that are each configured to detect an acoustic signal and transmit a detected acoustic signal over a wireless data network, and a digital receiver configured to receive the acoustic signal from the wireless data network, decode the acoustic signal, and compare the decoded signal with one or more entries in a database in order to determine a source of the acoustic signal. At least one hydrophone is located in or on a buoy.

In an embodiment, a method of locating and identifying an electronic component may include receiving, by a detection device, an acoustic signal from an acoustic tag embedded within or affixed to the electronic component, decoding the acoustic signal using a digital receiver, comparing the decoded signal with one or more entries in a database each corresponding to a unique electronic component, and identifying the electronic device from which the acoustic signal is received based on the comparison.

In an embodiment, a method of locating and identifying an electronic component may include receiving, by a detection device, an acoustic signal from an acoustic tag embedded within or affixed to the electronic component, decoding the acoustic signal using a digital receiver, determining a signal code represented by the decoded acoustic signal, comparing the signal code with one or more entries in a database each corresponding to a unique electronic component, and identifying the electronic device from which the acoustic signal is received based on the comparison.

BRIEF DESCRIPTION OF THE FIGURES

FIG. 1 depicts a block diagram of an exemplary acoustic tag for tracking an electronic component according to an embodiment.

FIG. 2 depicts a block diagram of an illustrative system for tracking an object according to an embodiment.

DETAILED DESCRIPTION

Figure 3:
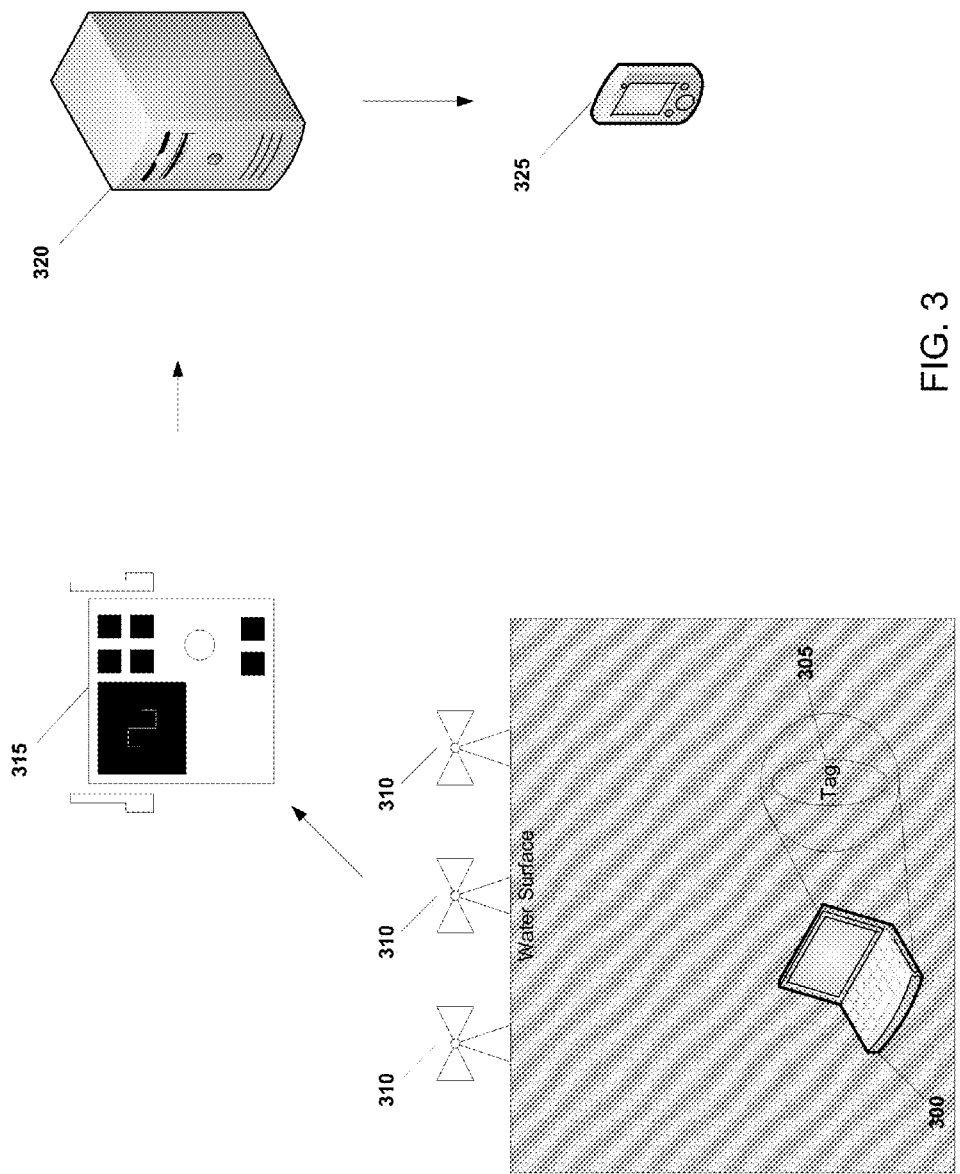
FIG. 3 depicts a block diagram for an alternate illustrative system for tracking an object according to an embodiment.

The following terms shall have, for the purposes of this application, the respective meanings set for the below.

The present disclosure is directed to an acoustic tag for tracking an electronic component, and methods and systems for using the same. Acoustic tags are affixed to or embedded into solid e-waste components and contain information related to the physical feature or item that it is attached to or to the recyclability of the particular e-waste component.

Acoustic tags may transmit a unique pre-programmed sound signal in a chosen frequency range at a predetermined time interval. The transmitted signal is designed to be detectable by a microphone or hydrophone (for underwater e-waste locations), matched to a signal code that allows the unique identification of the item being tagged. Each tag contains information unique to the item being tagged including, for example and without limitation, the current location, material attributes, the date of production, the place of origin and the like.

FIG. 1 depicts a block diagram of an exemplary acoustic tag for tracking an electronic component according to an embodiment. As shown in FIG. 1, the acoustic tag includes a power source 105 and a transmitter 110 in electrical communication with the power source and configured to transmit an acoustic signal. The acoustic signal may include a unique acoustic code that is configured to provide information pertaining to one or more of the electronic component and the recyclability of the electronic component.

The power source 105 and the transmitter 110 are configured to be one or more of affixed to or embedded in the electronic component. In an embodiment, the power source 105 comprises a battery. In an embodiment, the power source 105 comprises a solar cell. In an embodiment, that power source 105 comprises an inductor.

In an embodiment, the transmitter 110 comprises a transducer. In such an embodiment, the transducer may include one or more of quartz, barium titanate, lead zirconate titanate (PZT), bismuth sodium titanate, potassium sodium titanate, and combinations thereof. In an embodiment, the transmitter 110 comprises a piezoelectric polymer film. In an embodiment, the transmitter 110 comprises a digital signal processor. In an embodiment, the transmitter 110 may be configured to produce an acoustic pressure wave when a voltage is applied across the transmitter.

In an embodiment, the transmitter 110 is configured to transmit the acoustic signal at a regular time interval. In an embodiment, the transmitter 110 is configured to transmit the acoustic signal in response to the acoustic tag being activated by one or more of light, movement, an external acoustic signal and the like.

In an embodiment, the transmitter 110 is configured to transmit the acoustic signal in a frequency range. For example, the frequency range may be about 50 Hz to about 50 kHz. Specific examples of frequencies include about 50 Hz, about 100 Hz, about 500 Hz, about 1 kHz, about 10 kHz, about 20 kHz, about 30 kHz, about 40 kHz, about 50 kHz, and ranges between any two of these values (such as about 20 kHz to about 40 kHz). Other frequency ranges may be used within the scope of the current disclosure, including, without limitation, infrasonic frequencies and ultrasonic frequencies.

In an embodiment, the transmitter 110 is configured to transmit a pulse that includes one or more waveforms. Exemplary waveforms transmitted by the transmitter 110 include, without limitation, a constant amplitude sinusoidal waveform, a frequency shifted waveform, a frequency modulated waveform, a pulse train, and the like. In an alternate embodiment, the transmitter 110 may be configured to transmit a time-continuous spectrum having one or more amplitude peaks at corresponding frequencies. These frequencies may be used, for example, to classify the object with which the transmitter 110 is associated.

In an embodiment, the information provided by the unique acoustic code may include global positioning coordinates corresponding to a location of the electronic component. In an embodiment, the information provided by the unique acoustic code may include one or more of the following: a size of the electronic device, a color of the electronic device, a temperature of the electronic device, a material composition of the electronic device, a date of manufacture of the electronic device, a place of manufacture of the electronic device, and the like. In an embodiment, the acoustic signal is configured to be modifiable based on a current state of the acoustic tag. For example, the acoustic tag may change if the transmitter 110 transmits a tag including GPS coordinates for the electronic component, and the electronic component is in transit.

FIG. 2 depicts a block diagram of an illustrative system for tracking an object according to an embodiment. As shown in FIG. 2, the system may include an acoustic tag 205 affixed to or embedded in the object 200, one or more signal detection devices 210, and a digital receiver 215. The acoustic tag 205 may be configured to transmit an acoustic signal that includes a unique acoustic code configured to provide information regarding one or more of the object and the recyclability of the object.

The acoustic tag 205 may include one or more of the components or materials described above in reference to the acoustic tag of FIG. 1. In addition, the acoustic tag 205 may include a transmitter that operates in accordance with the teachings of the transmitter 110 of FIG. 1, including the time intervals for transmission, the frequency ranges, the waveforms, and the other features described above in reference to FIG. 1.

The one or more signal detection devices 210 may each be configured to detect an acoustic signal produced by the acoustic tag 205. In an embodiment, at least one signal detection device 210 may be a microphone. In an embodiment, at least one signal detection device 210 may be a hydrophone. Additional or alternate signal detection devices may also be used within the scope of this disclosure.

The digital receiver 215 may be configured to decode the acoustic signal and compare the decoded signal with one or more entries in a database in order to determine a source of the acoustic signal. The database may be incorporated into the digital receiver 215 or may be accessible by the digital receiver via, for example and without limitation, a wireless network, such as a Wi-Fi network or a cellular telephone communication network, or a wired network including one or more of a local area network, a wide area network, an intranet, the Internet, or the like. In an embodiment, the digital receiver 215 may be further configured to transmit information pertaining to the source of the acoustic signal to an electronic device 220, such as a mobile electronic device, a digital display, a computer system, a cloud-based computing system or the like. The information pertaining to the source of the acoustic signal may be displayed on the electronic device 220 or otherwise communicated to a user of the electronic device.

In an embodiment, the object may be an electronic component, such as a computer system, a mobile device, a television, a gaming system or any other electronic device. In an embodiment, the acoustic tag 205 may interface with one or more speakers incorporated into the object in order to produce the acoustic signal.

FIG. 3 depicts a block diagram for an alternate illustrative system for tracking an object according to an embodiment. As shown in FIG. 3, the system may include an acoustic tag 305 affixed to or embedded in the object 300, one or more hydrophones 310, and a digital receiver 315, a database 320, and an electronic device 325. The acoustic tag 305 may be configured to transmit an acoustic signal. The acoustic signal may include a unique acoustic code configured to provide information regarding one or more of the object and the recyclability of the object.

The acoustic tag 305 may include one or more of the components or materials described above in reference to the acoustic tag of FIG. 1. In addition, the acoustic tag 305 may include a transmitter that operates in accordance with the teachings of the transmitter 110 of FIG. 1, including the time intervals for transmission, the frequency ranges, the waveforms, and the other features described above in reference to FIG. 1.

The one or more hydrophones 310 may each be configured to detect an acoustic signal produced by the acoustic tag 305. The one or more hydrophones 310 may each transmit a detected acoustic signal over a wireless data network, such as a cellular phone network or other wireless network. At least one hydrophone 310 may be located in, on or otherwise attached to a buoy or other floatation device.

The digital receiver 315 may be configured to receive the acoustic signal from the wireless data network, decode the acoustic signal and compare the decoded signal with one or more entries in a database, such as 320, in order to determine a source of the acoustic signal. The database 320 may be incorporated into the digital receiver 315 or may be accessible by the digital receiver via, for example and without limitation, a wireless network, such as a Wi-Fi network or a cellular telephone communication network, or a wired network including one or more of a local area network, a wide area network, an intranet, the Internet, or the like. In an embodiment, the digital receiver 315 may be further configured to transmit information pertaining to the source of the acoustic signal to an electronic device, such as 325. The electronic device may include, without limitation, a mobile electronic device, a digital display, a computer system, a cloud-based computing system or the like. The information pertaining to the source of the acoustic signal may be displayed on the electronic device 325 or otherwise communicated to a user of the electronic device.

In an embodiment, the object may be an electronic component, such as a computer system, a mobile device, a television, a gaming system or any other electronic device. In an embodiment, the acoustic tag 305 may interface with one or more speakers incorporated into the object in order to produce the acoustic signal.

Figure 4:
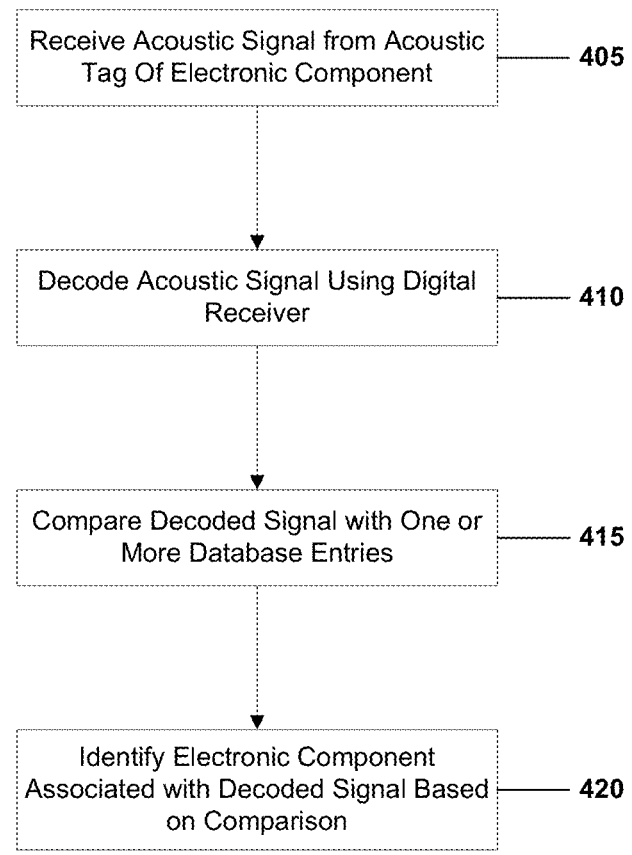
FIG. 4 depicts a flow diagram for an illustrative method of locating and identifying an electronic component according to an embodiment.

FIG. 4 depicts a flow diagram for an illustrative method of locating and identifying an electronic component according to an embodiment. As shown in FIG. 4, a detection device may receive 405 an acoustic signal from an acoustic tag embedded within or affixed to an electronic component. In an embodiment, the acoustic signal may be a signal in a frequency range, such as about 50 Hz to about 50 kHz. Specific examples of frequencies include about 50 Hz, about 100 Hz, about 500 Hz, about 1 kHz, about 10 kHz, about 20 kHz, about 30 kHz, about 40 kHz, about 50 kHz, and ranges between any two of these values (such as about 20 kHz to about 40 kHz). In an embodiment, the acoustic signal may be a pulse including one or more waveforms. The one or more waveforms may include one or more of the following: a constant amplitude sinusoidal waveform, a frequency shifted waveform, a frequency modulated waveform and a pulse train. In an embodiment, the acoustic signal may be a time-continuous spectrum having one or more amplitude peaks at corresponding frequencies. In an embodiment, a hydrophone may be used to receive 405 the acoustic signal. Alternately, a microphone may be used to receive 405 the acoustic signal.

In an embodiment, the acoustic signal may be transmitted from the detection device to the digital receiver. Such an embodiment may be required when the detection device and the digital receiver are not part of the same device. In an alternate embodiment, a single device may incorporate both the detection device and the digital receiver.

The acoustic signal may be decoded 410 using a digital receiver. The digital receiver may decode 410 the acoustic signal by determining on e or more characteristics of the acoustic signal. For example, the digital receiver may determine frequencies having pulses of high amplitude or other similar details regarding the acoustic signal. Such details of the acoustic signal may be used, when decoded, to identify particular information regarding the electronic component from which the acoustic signal originates, including static information, such as information pertaining to the construction of the component, and dynamic features, such as coordinates as determined by a positioning system.

The decoded signal may be compared 415 with one or more entries in a database. Each entry may correspond to a unique electronic component. For example, the decoded signal may identify a particular spectrum of signals having specific magnitudes at particular frequencies. The database may include an entry that has a similar spectrum as being associated with a particular electronic component. As such, when the decoded signal is compared with the database entry and a match is found, the acoustic signal may be identified 420 as being from the electronic component associated with the database entry.

In an embodiment, an indication of the identified electronic component may be displayed. For example, the indication of the identified electronic component may be displayed on an electronic device, such as a mobile electronic device or a digital display.

In an embodiment, the indication of the identified electronic component may be stored on a computer system. In a more particular embodiment, the indication of the identified electronic component may be stored on a cloud-based computing system.

Figure 5:
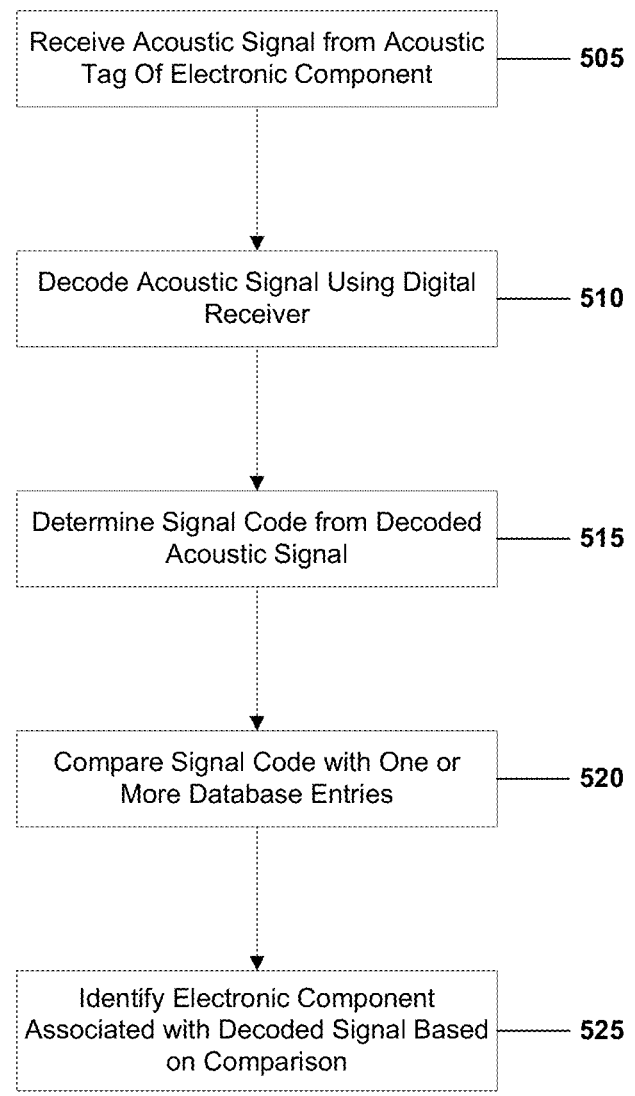
FIG. 5 depicts a flow diagram for an alternate illustrative method of locating and identifying an electronic component according to an embodiment.

FIG. 5 depicts a flow diagram for an alternate illustrative method of locating and identifying an electronic component according to an embodiment. As shown in FIG. 5, a detection device may receive 505 an acoustic signal from an acoustic tag embedded within or affixed to the electronic component. In an embodiment, the acoustic signal may be a signal in a frequency range, such as about 50 Hz to about 50 kHz. Specific examples of frequencies include about 50 Hz, about 100 Hz, about 500 Hz, about 1 kHz, about 10 kHz, about 20 kHz, about 30 kHz, about 40 kHz, about 50 kHz, and ranges between any two of these values (such as about 20 kHz to about 40 kHz). In an embodiment, the acoustic signal may be a pulse including one or more waveforms. The one or more waveforms may include one or more of the following: a constant amplitude sinusoidal waveform, a frequency shifted waveform, a frequency modulated waveform and a pulse train. In an embodiment, the acoustic signal may be a time-continuous spectrum having one or more amplitude peaks at corresponding frequencies. In an embodiment, a hydrophone may be used to receive 505 the acoustic signal. Alternately, a microphone may be used to receive 505 the acoustic signal.

In an embodiment, the acoustic signal may be transmitted from the detection device to the digital receiver. Such an embodiment may be required when the detection device and the digital receiver are not part of the same device. In an alternate embodiment, a single device may incorporate both the detection device and the digital receiver.

The acoustic signal may be decoded 510 using a digital receiver. The digital receiver may decode 510 the acoustic signal by determining on e or more characteristics of the acoustic signal. For example, the digital receiver may determine frequencies having pulses of high amplitude or other similar details regarding the acoustic signal. Such details of the acoustic signal may be used, when decoded, to identify particular information regarding the electronic component from which the acoustic signal originates, including static information, such as information pertaining to the construction of the component, and dynamic features, such as coordinates as determined by a positioning system.

A signal code may be determined 515 from the decoded acoustic signal. In particular, the decoded acoustic signal may represent a particular signal code based on its characteristics. For example, the signal code may be determined 515 by identifying peaks for the acoustic signal that exist at particular frequencies. In an embodiment, the signal code may represent an alphanumeric code. Alternately, the signal code may represent a numeric code. In an embodiment, the signal code may be determined 515 according to an aural code standard. For example, the aural code standard may represent information aurally in a manner similar to the way that a Universal Product Code represents information visually. In particular, each frequency peak may represent a value for a particular digit of the signal code, and the particular position to which the value is entered is based on a time at which the frequency peak occurs. The acoustic signal may include a number of frequency peaks equal to the number of placeholders in the aural code. Alternate methods of representing a signal code may also be used within the scope of this disclosure.

The signal code may be compared 520 with one or more entries in a database. Each entry may correspond to a unique electronic component. For example, the database may include an entry that matches the signal code received from a particular electronic component. As such, when the signal code is compared with the database entry and a match is found, the acoustic signal may be identified 525 as being from the electronic component associated with the database entry.

In an embodiment, an indication of the identified electronic component may be displayed. For example, the indication of the identified electronic component may be displayed on an electronic device, such as a mobile electronic device or a digital display.

In an embodiment, the indication of the identified electronic component may be stored on a computer system. In a more particular embodiment, the indication of the identified electronic component may be stored on a cloud-based computing system.

Figure 6:
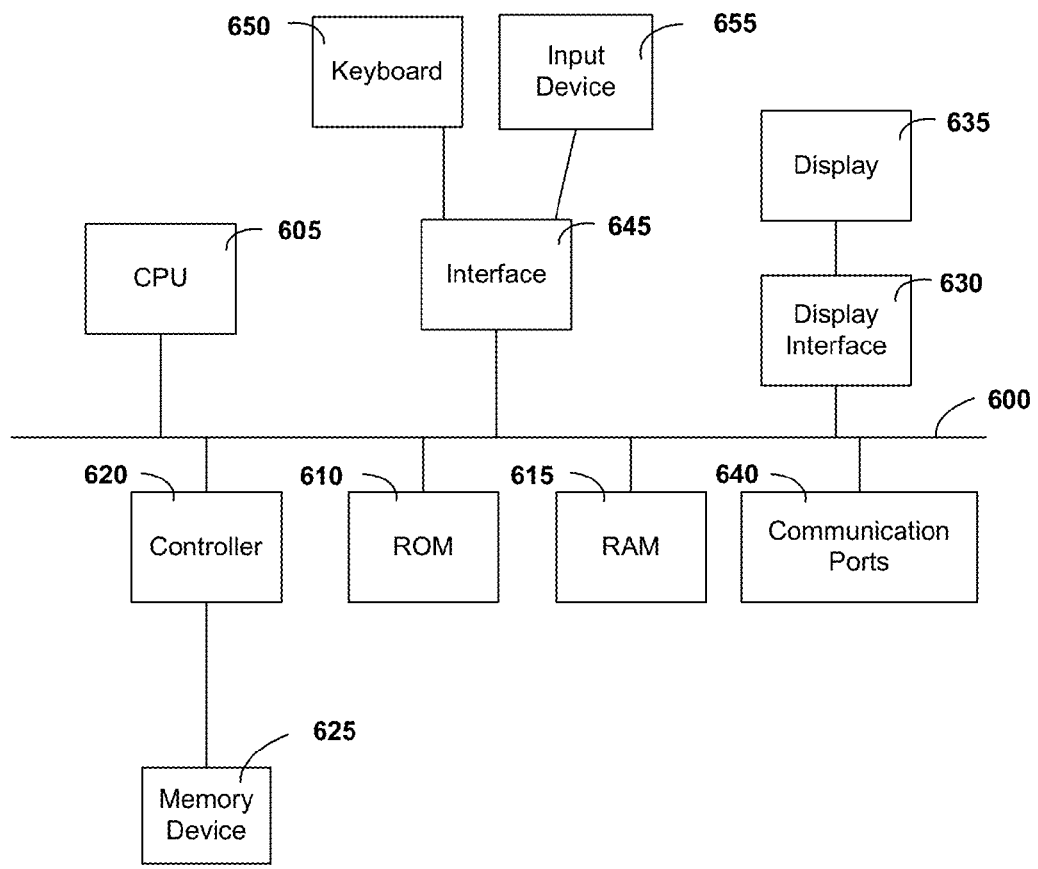
FIG. 6 depicts a block diagram of illustrative internal hardware that may be used to contain or implement program instructions according to an embodiment.

FIG. 6 depicts a block diagram of exemplary internal hardware that may be used to contain or implement program instructions, such as the process steps discussed above in reference to FIGS. 4 and 5, according to embodiments. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an exemplary processing device, computing device or processor as such terms are used within this disclosure. Read only memory (ROM) 610 and random access memory (RAM) 615 constitute exemplary memory devices (i.e., processor-readable non-transitory storage media).

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 630 may permit information from the bus 600 to be displayed on the display 635 in audio, visual, graphic or alphanumeric format. Communication with external devices, such as a print device, may occur using various communication ports 640. An exemplary communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

EXAMPLES

Example 1

Acoustic Tag for Computer System

When manufactured, a computer will have an acoustic tag placed within the computer. The acoustic tag is powered by a battery that stores power generated by the motherboard during the period of time in which the computer is being used. Once the computer is discarded, the battery stores sufficient power to enable the acoustic tag to generate an intermittent acoustic signal over an extended period of time. The acoustic signal is initiated in response to the computer being disconnected from a power source for a period of time. The acoustic signal is transmitted on an intermittent basis thereafter until the power stored in the battery is consumed. The acoustic signal identifies the computer as well as positioning information. The acoustic signal is transmitted through speakers that are internal to the computer.

A receiving device is used to receive the acoustic signal and determine the source of the acoustic signal based on the information transmitted by the acoustic tag. The positioning information assists in the recovery of the computer from its discarded location. The internal components of the computer are then disposed of or recycled in accordance with pertinent environmental standards.

Example 2

Hydrophonic Acoustic Tag for Mobile Electronic Device

A smart phone is manufactured with an acoustic tag that is capable of transmitting a signal when underwater. The acoustic tag is powered by a battery that stores power received from the mobile device during normal operation. The battery stores sufficient power to enable the acoustic tag to generate an intermittent acoustic signal over an extended period of time. The acoustic signal is initiated in response to the mobile phone being disconnected from a cellular network. The acoustic signal is transmitted on an intermittent basis thereafter until the power stored in the battery is consumed. The acoustic signal identifies the mobile electronic device based on an aural code standard. In other words, the acoustic signal includes manufacturer information and device type information that uniquely identifies the type of device transmitting the acoustic signal. In addition, the acoustic signal transmits positioning coordinates to identify the location of the mobile device. The acoustic signal is transmitted through speakers that are internal to the mobile device.

A receiving device is used to receive the acoustic signal and determine the source of the acoustic signal based on the information transmitted by the acoustic tag. The positioning information assists in the recovery of the mobile device from its discarded location. If the mobile device is underwater, the presence, location and type of device may be determined using a hydrophone. The mobile device may then be disposed of or recycled in accordance with pertinent environmental standards.

Example 3

Acoustic Tag Detection System

A plurality of microphones are stationed at various locations around a landfill. Each microphone is in operable communication with a wireless transmitter used to transmit information to a centralized digital receiver. When a microphone detects an acoustic signal, the microphone transmits the acoustic signal to the digital receiver for processing. The digital receiver processes the information received from a transmission and compares the processed information with entries in a database to identify a type of electronic device detected by the microphone. In some cases, the microphone may provide location information based on its own identifying information. Alternately, the acoustic signal may include positioning information. Information regarding the location and type of electronic component that was detected are then displayed to a user via a display.

Example 4

Mobile Acoustic Tag Detection System

A microphone is attached to a vehicle. The microphone is in operable communication with a digital receiver that is also located on the vehicle. When the microphone detects an acoustic signal, the microphone transmits the information to the digital receiver for processing. The digital receiver processes the information, compares the processed information with entries in a database, and determines a location from which the acoustic signal originated. Information regarding the location and type of electronic component that was detected are then displayed to a user via a display.

Example 5

Hydrophonic Acoustic Tag Detection System

Hydrophones are attached to buoys floating on top of an aquatic environment. Each hydrophone includes a satellite transmitter for transmitting information that it receives to a centralized digital receiver. The hydrophone further includes a solar cell and a battery for receiving and storing the power that it requires to make such transmissions. When a hydrophone detects an acoustic signal, the hydrophone transmits the acoustic signal via the satellite transmitter to the digital receiver for processing. The digital receiver processes the information received from a transmission and compares the processed information with entries in a database to identify a type of electronic device detected by the hydrophone. In some cases, the hydrophone may provide location information based on its own identifying information. Alternately, the received acoustic signal may include positioning information. Information regarding the location and type of electronic component that was detected are then displayed to a user via a display.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system to track an electronic component, the system comprising:
    an acoustic tag affixed to or embedded in the electronic component, wherein the acoustic tag is configured to transmit an acoustic signal through a liquid at a time-continuous spectrum having one or more amplitude peaks at corresponding frequencies, wherein the acoustic signal comprises a unique acoustic code that is configured to provide information regarding the electronic component and a recyclability of the electronic component;
    one or more hydrophones, wherein each hydrophone is configured to detect the acoustic signal and transmit the detected acoustic signal over a wireless data network, wherein at least one of the one or more hydrophones is located in or on a floatation device; and
    a digital receiver configured to receive the acoustic signal from the wireless data network, decode the acoustic signal, and compare the decoded signal with one or more entries in a database in order to determine a source of the acoustic signal.

2. The system of claim 1, wherein the acoustic tag is configured to produce an acoustic pressure wave in response to a voltage applied across the acoustic tag.

3. The system of claim 1, wherein the acoustic tag comprises a digital signal processor.

4. The system of claim 1, wherein the acoustic tag is configured to transmit the acoustic signal in response to the acoustic tag being activated by one or more of light, movement, and an acoustic signal.

5. The system of claim 1, wherein the acoustic tag is configured to transmit the acoustic signal in a frequency range.

6. The system of claim 1, wherein the acoustic tag is configured to transmit a pulse comprising one or more waveforms.

7. The system of claim 1, wherein the digital receiver is further configured to transmit information pertaining to the source of the acoustic signal to an electronic device.

8. A system to track an electronic component comprising disposed electronic waste, the system comprising:
    an acoustic tag affixed to or embedded in the electronic component comprising the disposed electronic waste, wherein the acoustic tag is configured to transmit an acoustic signal through a liquid, wherein the acoustic signal comprises a unique acoustic code that is configured to provide information regarding the electronic component and a recyclability of the electronic component;
    one or more hydrophones, wherein each hydrophone is configured to detect the acoustic signal and transmit the detected acoustic signal over a wireless data network, wherein at least one of the one or more hydrophones is located in or on a floatation device; and
    a digital receiver configured to receive the acoustic signal from the wireless data network, decode the acoustic signal, and compare the decoded signal with one or more entries in a database in order to determine a source of the acoustic signal.

9. The system of claim 8, wherein the acoustic tag is configured to produce an acoustic pressure wave in response to a voltage applied across the acoustic tag.

10. The system of claim 8, wherein the acoustic tag comprises a digital signal processor.

11. The system of claim 8, wherein the acoustic tag is configured to transmit the acoustic signal in response to the acoustic tag being activated by one or more of light, movement, and an acoustic signal.

12. The system of claim 8, wherein the acoustic tag is configured to transmit the acoustic signal in a frequency range.

13. The system of claim 8, wherein the acoustic tag is configured to transmit a pulse comprising one or more waveforms.

14. The system of claim 8, wherein the digital receiver is further configured to transmit information pertaining to the source of the acoustic signal to an electronic device.

15. The system of claim 8, wherein the information comprises global positioning coordinates corresponding to a location of the electronic component.

16. The system of claim 8, wherein the information comprises one or more of a size of the electronic component, a color of the electronic component, a temperature of the electronic component, a material composition of the electronic component, a date of manufacture of the electronic component, and a place of manufacture of the electronic component.

17. The system of claim 8, wherein the acoustic signal is configured to be modifiable based on a current state of the acoustic tag.

18. The system of claim 1, wherein the information comprises global positioning coordinates corresponding to a location of the electronic component.

19. The system of claim 1, wherein the information comprises one or more of a size of the electronic component, a color of the electronic component, a temperature of the electronic component, a material composition of the electronic component, a date of manufacture of the electronic component, and a place of manufacture of the electronic component.

20. The system of claim 1, wherein the acoustic signal is configured to be modifiable based on a current state of the acoustic tag.

* * * * *